US011477690B2

(12) United States Patent
Zhu et al.

(10) Patent No.: US 11,477,690 B2
(45) Date of Patent: Oct. 18, 2022

(54) METHOD FOR INFLUENCING DATA TRAFFIC ROUTING IN CORE NETWORKS BY SERVICE APPLICATIONS

(71) Applicant: ZTE Corporation, Guangdong (CN)

(72) Inventors: Jinguo Zhu, Guangdong (CN); Shuang Liang, Guangdong (CN); Zhijun Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/691,345

(22) Filed: Mar. 10, 2022

(65) Prior Publication Data

US 2022/0201543 A1 Jun. 23, 2022

Related U.S. Application Data

(63) Continuation of application No. PCT/CN2019/105585, filed on Sep. 12, 2019.

(51) Int. Cl.
H04W 28/02 (2009.01)
H04W 28/08 (2009.01)
H04W 40/02 (2009.01)

(52) U.S. Cl.
CPC ... *H04W 28/0273* (2013.01); *H04W 28/0263* (2013.01); *H04W 28/0925* (2020.05); *H04W 40/02* (2013.01)

(58) Field of Classification Search
CPC ......... H04W 28/0273; H04W 28/0925; H04W 28/0263; H04W 40/02
See application file for complete search history.

(56) References Cited

U.S. PATENT DOCUMENTS

| 2018/0199398 | A1* | 7/2018 | Dao | H04W 76/27 |
| 2019/0174449 | A1* | 6/2019 | Shan | H04W 60/00 |
| 2019/0261260 | A1* | 8/2019 | Dao | H04W 36/0011 |
| 2020/0228605 | A1* | 7/2020 | Dodd-Noble | H04L 63/20 |
| 2020/0305118 | A1* | 9/2020 | Ryu | H04W 76/10 |
| 2020/0329008 | A1* | 10/2020 | Dao | G06F 16/953 |

(Continued)

FOREIGN PATENT DOCUMENTS

| CN | 108632882 A | 10/2018 |
| CN | 109673005 A | 4/2019 |

(Continued)

OTHER PUBLICATIONS

Ericsson, "3GPP TSG-SA WG2 Meeting #130 S2-1900088"; Mobility Restrictions for Wireline Access; Jan. 25, 2019; 41 pages.

(Continued)

*Primary Examiner* — Mehmood B. Khan
(74) *Attorney, Agent, or Firm* — Crowell & Moring LLP

(57) ABSTRACT

This disclosure relates to mechanisms for effectuating data traffic routing influence in a core network of a communication system by service applications outside of the core network. The mechanism may be implemented for the core network to establish communication sessions within the core network that route data traffic according to the data traffic routing influence requests from application servers. The mechanism may further be implemented for the core network to modify or reconfigure network nodes for an active existing communication session within the core network to effectuate data traffic routing influence request from the application servers.

20 Claims, 6 Drawing Sheets

(56) References Cited

U.S. PATENT DOCUMENTS

| | | | |
|---|---|---|---|
| 2020/0389876 A1* | 12/2020 | Islam | H04W 72/042 |
| 2021/0058826 A1* | 2/2021 | Mao | H04W 28/0933 |
| 2021/0250446 A1* | 8/2021 | Qiao | H04M 15/59 |
| 2022/0086698 A1* | 3/2022 | Yao | H04L 43/20 |
| 2022/0151004 A1* | 5/2022 | Sedlacek | H04W 8/082 |
| 2022/0191916 A1* | 6/2022 | Talarico | H04L 27/2607 |
| 2022/0191934 A1* | 6/2022 | Miao | H04W 74/0833 |

FOREIGN PATENT DOCUMENTS

| | | |
|---|---|---|
| CN | 110048867 A | 7/2019 |
| WO | WO 2018/131984 A1 | 7/2018 |
| WO | WO 2019/011190 A1 | 1/2019 |

OTHER PUBLICATIONS

NTT Docomo; "3GPP TSG-SA2 Meeting #134 S2-1908617"; Completion of the PCF Group; Jul. 28, 2019; 51 pages.

International Search Report dated May 27, 2020 for International Application No. PCT/CN2019/105585.

Written Opinion dated May 27, 2020 for International Application No. PCT/CN2019/105585.

* cited by examiner

METHOD FOR INFLUENCING DATA TRAFFIC ROUTING IN CORE NETWORKS BY SERVICE APPLICATIONS

This application is a continuation of and claims priority to International Application No. PCT/CN2019/105585, filed Sep. 12, 2019, the entirety of which is hereby incorporated by reference.

TECHNICAL FIELD

This disclosure is generally directed to mechanisms for influencing data traffic routing in a core communication network by service applications, and is particularly directed to mechanisms for enabling data traffic offloading from a core network as requested by service applications.

BACKGROUND

A wireless or wireline communication system may include a core network. A core network provides various network nodes for provisioning and routing data traffic between user equipment (UE) and service applications. Network nodes in the core network involved in a particular communication session may be selected, configured, and controlled by the core network itself. In some situation, it may be beneficial to provide mechanisms for the service applications to proactively request to influence data traffic routing in the core network. For example, a service application in certain circumstances may desire to effectuate offloading of UE data traffic from an intermediate network routing node of the core network to a predetermined data network destination outside of the core network.

SUMMARY

This disclosure relates to methods, systems, and devices for effectuating data traffic routing influence in a core network of a communication network system initiated by service applications outside of the core network.

In one implementations, a method performed in a mobile core network is disclosed. The mobile core network may include an access and mobility control node, a policy control node associated with the access and mobility control node, an application data repository node, and a plurality of communication session control nodes. The method may include registering, by the policy control node, a data subscription to the application data repository node for the policy control node to be notified of modification in application data; receiving, by the policy control node, a notification message containing a modification of application data by a service application from the application data repository node as a result of the data subscription; and extracting, by the policy control node, a set of data traffic routing influence information associated with the service application from the notification message. The method may further include transmitting, by the policy control node, the set of data traffic routing influence information to the access and mobility control node for effectuating a control over allocation or reconfiguration of at least one communication session control node among the plurality of communication session control nodes for a communication session in the mobile core network implicated by the set of data traffic routing influence information.

In another implementation, another method performed in a mobile core network is disclosed. The mobile core network may include an access and mobility control node, a policy control node associated with the access and mobility control node, an application data repository node, and a plurality of communication session control nodes. The method may include receiving, by the access and mobility control node, a set of data traffic routing influence information associated with a service application from the policy control node, wherein the set of data traffic routing influence information is extracted by the policy control node from a notification message sent by the application data repository node to the policy control node as a result of a data subscription to the application data repository node by the policy control node for the policy control node to be informed of modification of application data; receiving, by the access and mobility control node, a communication session establishment request from a requesting mobile user equipment; determining, by the access and mobility control node, a location of the requesting mobile user equipment; determining, by the access and mobility control node, whether the requesting mobile user equipment is implicated by the set of data traffic routing influence information. The method may further include, when the requesting mobile user equipment is implicated by the set of data routing traffic influence information, selecting, by the access and mobility control node, a subset of communication session control nodes from the plurality of communication session control nodes based on the location of the requesting mobile user equipment and the set of data traffic routing influence information for establishing a new communication session in response to the communication session establishment request.

In another implementation, another method performed in a mobile core network is disclosed. The mobile core network may include an access and mobility control node, a policy control node associated with the access and mobility control node, an application data repository node, a plurality of communication session control nodes, and a plurality of data routing nodes. The method may include receiving, by the access and mobility control node, a set of data traffic routing influence information associated with a service application from the policy control node, wherein the set of data traffic routing influence information is extracted by the policy control node from a notification message sent by the application data repository node to the policy control node as a result of a data subscription to the application data repository node by the policy control node for the policy control node to be informed of modification of application data; determining, by the access and mobility control node, an identity of a mobile user equipment implicated by the set of data traffic routing influence information; identifying, by the access and mobility control node, an active communication session associated with the identity of the mobile user equipment; identifying, by the access and mobility control node, a subset of communication session control nodes among the plurality of communication session control nodes that are associated with and control a subset of data routing nodes among the plurality of data routing nodes; and modifying, by the access and mobility control node, a composition or configuration of the subset of communication session control nodes according to the set of data traffic routing influence information.

In another implementation, another method performed in a mobile core network is disclosed. The mobile core network may include an access and mobility control node, a policy control node associated with the access and mobility control node, an application data repository node, and a plurality of communication session control nodes. The method may include sending, by the policy control node, a data subscription to the application data repository node for the policy control node to be notified of modification in application data; receiving, by the policy control node, a notification message containing an modification of application data by a service application from the application data repository node as a result of the data subscription; extracting, by the policy control node, a set of data traffic routing influence information associated with the service application from the notification message; and transmitting, by the policy control nod, the set of data traffic routing influence information to the access and mobility control node; receiving, by the access and mobility control node, the set of data traffic routing influence information associated with a service application from the policy control node; receiving, by the access and mobility control node, a communication session request from a mobile user equipment; determining, by the access and mobility control node, a location of the mobile user equipment; determining, by the access and mobility control node, whether the mobile user equipment is implicated by the set of data traffic routing influence information. The method further include when the mobile user equipment is implicated by the set of data traffic routing influence information, selecting, by the access and mobility control node, a subset of communication session control nodes from the plurality of communication session control nodes based on the location of the mobile user equipment and the set of data traffic routing influence information.

In another implementation, another method performed in a mobile core network is disclosed. The mobile core network may include an access and mobility control node, a policy control node associated with the access and mobility control node, an application data repository node, a plurality of communication session control nodes, and a plurality of data routing nodes. The method may include registering, by the policy control node, a data subscription to the application data repository node for the policy control node to be notified of modification in application data; receiving, by the policy control node, a notification message containing an modification of application data by a service application from the application data repository node as a result of the data subscription; extracting, by the policy control node, a set of data traffic routing influence information associated with the service application from the notification message; transmitting, by the policy control nod, the set of data traffic routing influence information to the access and mobility control node; receiving, by the access and mobility control node, the set of data traffic routing influence information associated with a service application from the policy control node; determining, by the access and mobility control node, an identity of a mobile user equipment implicated by the set of data traffic routing influence information; identifying, by the access and mobility control node, an active communication session associated with the identity of the mobile user equipment; identifying, by the access and mobility control node, a subset of communication session control nodes among the plurality of communication session control nodes that are associated with and control a subset of data routing nodes among the plurality of data routing nodes; and modifying, by the access and mobility control node, a composition or configuration of the subset of communication session control nodes according to the set of data traffic routing influence information.

The above embodiments and other aspects and alternatives of their implementations are explained in greater detail in the drawings, the descriptions, and the claims below.

DETAILED DESCRIPTION

Figure 1:
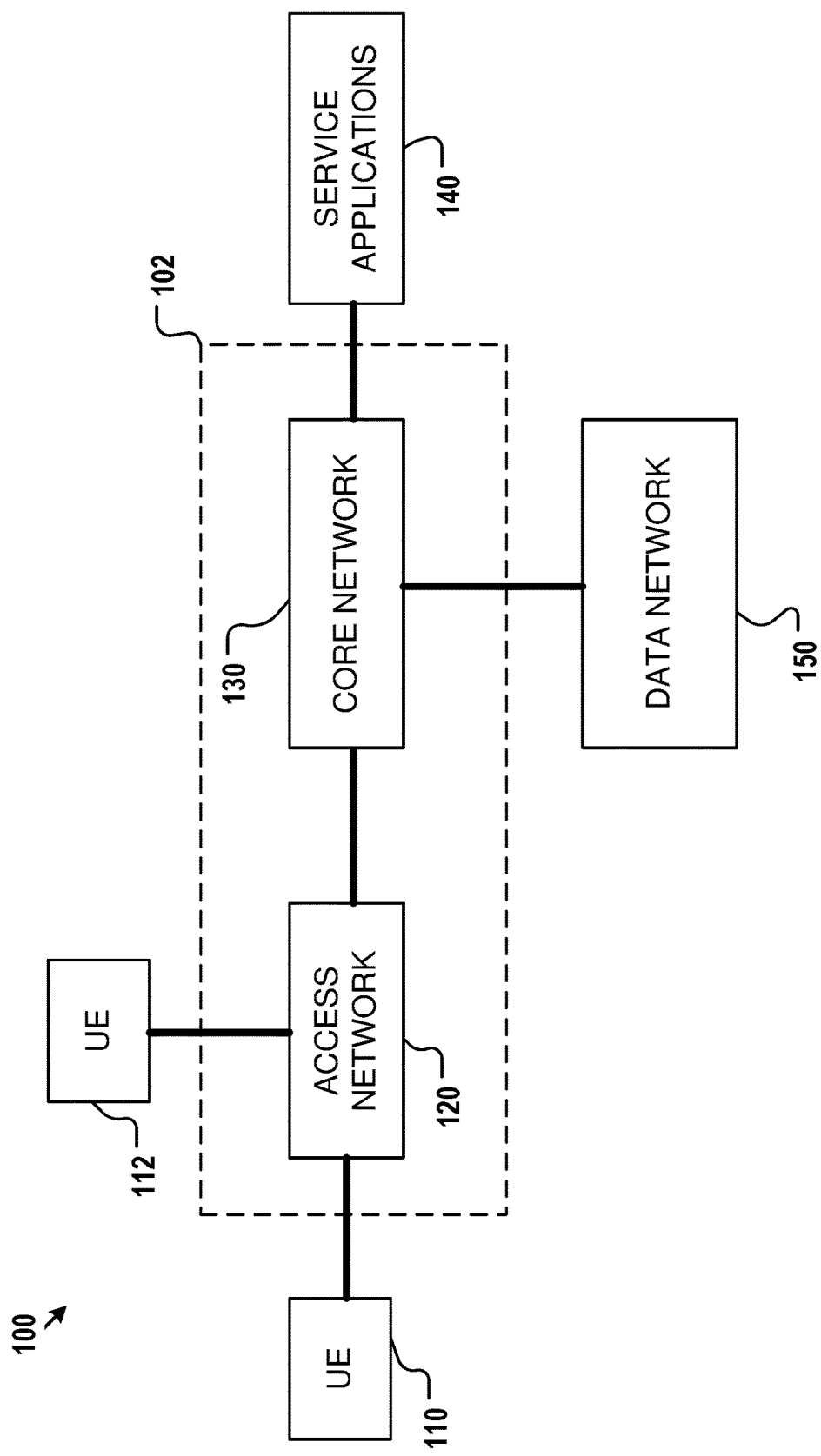
FIG. 1 shows an example communication network system including a carrier communication network containing an access network and a core network.

A communication network, shown as 100 in FIG. 1, may include user equipment (UE) 110 and 112, a carrier network 102, various service applications 140, and other data networks 150. The carrier network 102, for example, may include access networks 120 and core network 130. The carrier network 110 may be configured to transmit voice, data, and other information (collectively referred to as data traffic) among UEs 110 and 112, between the UEs and the service applications 140, or between the UEs and the other data networks 150. The Access networks 120 may be configured to interact with the UEs on one side of a communication session and the core network 130 on the other. The core network 130 may include various network nodes being configured to control communication sessions and perform network access management and traffic routing. The service applications 140 may be hosted by various application servers that are accessible by the UEs through the core network 130 of the carrier network 102. A service application 140 may be deployed as a data network outside of the core network 130. Likewise, the other data networks 150 may be accessible by the UEs through the core network 130 and appear as either data destination or origin of a particular communication session instantiated in the carrier network 102.

The core network 130 of FIG. 1 may include various network nodes geographically distributed and interconnected to provide network coverage of a service region of the carrier network 102. These network nodes may be implemented as dedicated hardware network nodes. Alternatively, these network nodes may be virtualized and implemented as virtual machines or as software entities. These network nodes may each be configured with one or more types of network functions which collectively provide the provisioning and routing functionalities of the core network 130.

Figure 2:
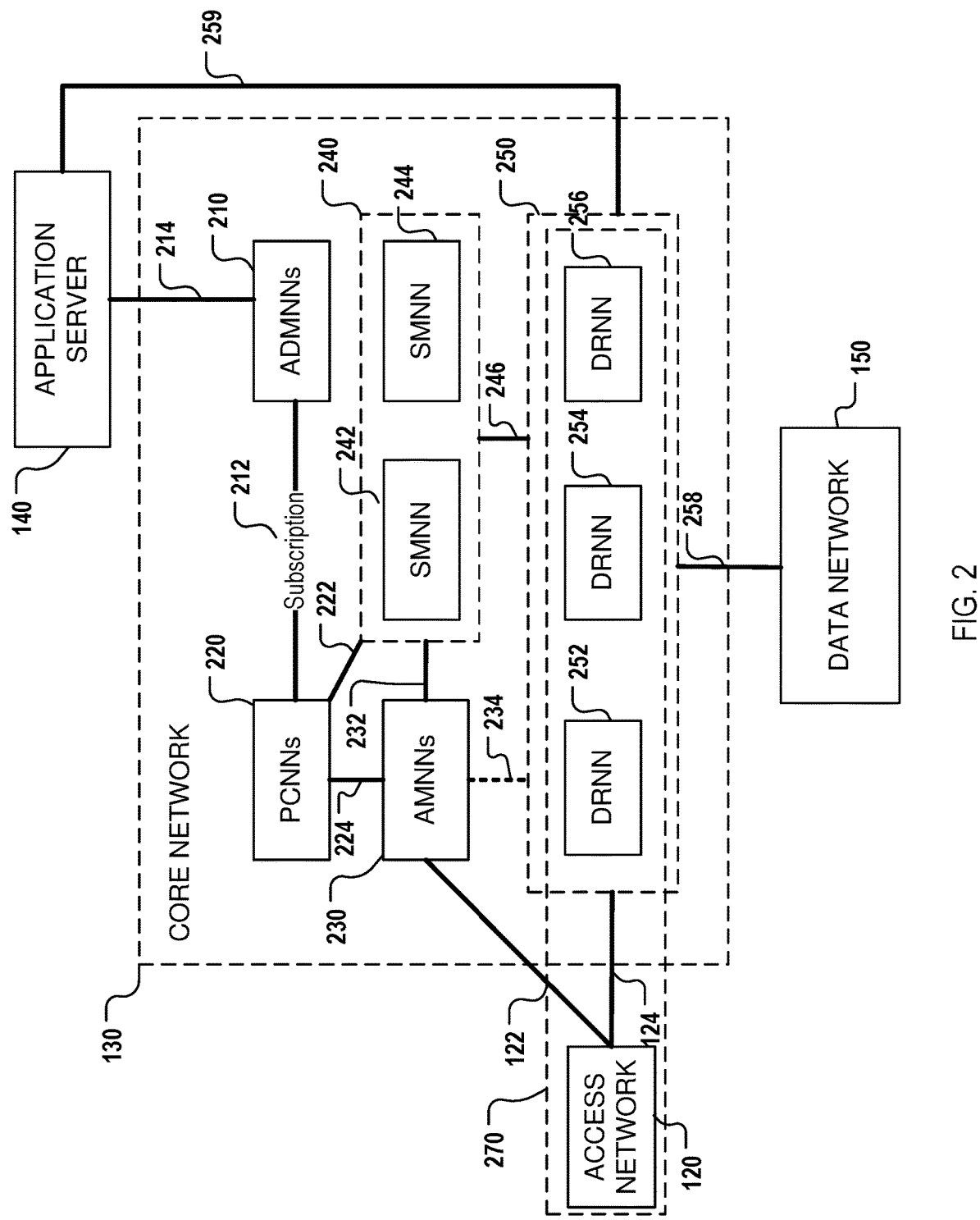
FIG. 2 shows an example core network that supports data traffic routing influence by a service application.

FIG. 2 shows an example division of network node functions in the core network 130. While only single instances of network nodes for some functions are illustrated in FIG. 2, those having ordinary skill in the art understand that each of these network nodes may be instantiated as multiple instances that are distributed throughout the core network 130. As shown in FIG. 2, the core network 130 may include but are not limited to access management network nodes (AMNNs) 230, session management network nodes (SMNNs) 240, data routing network nodes (DRNNs) 250, policy control network nodes (PCNNs) 220, and application data management network nodes (ADMNNs) 210.

The access management network nodes 230 communicate with the access network 120, the session management network nodes 242, and the policy control network nodes 220 respectively via communication interfaces 122, 232, and 224, and may be responsible for provisioning registration, authentication, and access by UE to the core network 130 was well as allocation of session management network nodes 240 to support a particular UE communication need. The session management network nodes 240 allocated by the access management network nodes 230 may in turn may be responsible for allocating data routing network nodes 250 for supporting the particular UE communication need and control these allocated data routing network nodes 250 via communication interface 246. Alternatively or additionally in some implementations, the data routing network nodes 250 may be directly allocated by the access management network nodes 230 via the interface 234 and controlled by the session management network 242 via the communication interface 246. Access policies and session routing policies applicable to the UEs may be managed by the policy control network nodes 220 which communicate the policies to the access management network nodes 230 and the session management network nodes 240 via communication interfaces 224 and 222, respectively. The signaling and data exchange between the various types of network nodes through various communication interfaces indicated by the various connection lines in FIG. 2, may be carried by signaling or data messages following predetermined types of format or protocols.

To support a particular end-to-end communication task requested by a UE, a communication session may be established to support a data traffic pipeline for transporting the particular end-to-end communication data traffic. The carrier network portion of the data traffic pipeline, as illustrated by 270 of FIG. 2, may involve one or more network nodes in the access network 120 and a set of data routing network nodes 252, 254, and 256 in the core network 130, as selected and controlled, for example, by a set of session management network nodes 242 and 244 which may be selected and controlled by the access management network nodes 230 that are responsible for establishing and managing the communication session. Data traffic is routed among a UE at one end of the data traffic pipeline, the carrier network portion of the data traffic pipeline (including the set of network nodes in the access network 120 and the selected data routing network nodes 252, 254, and 256 in the core network 130), and another end of the data traffic pipeline including, for example, another UE, the application server 140, or another data network 150, via communication interfaces such as 124, 258, and 259.

For some communication sessions, data transmitted in the core network 130 may terminate on the application server 140. In other words, the application server 140 may be a destination of data traffic routed in the core network 130. Likewise, the application server 140 may also be source of data traffic to be routed by the core network 130 to other destinations. In such a communication session, the application server 140 may be accessed by the carrier network portion 270 of the data traffic pipeline for the communication session, as indicated by 259.

The application server 140 may further communicate other configuration and control information to the core network 130. The information communicated to the core network 130 may be referred to as application data. Such application data may be processed and managed by a specific type of network nodes referred to as the application data management network nodes (ADMNNs) 210 in FIG. 2.

The application data may be communicated, for example, in a message from the application server 140 to the application data management network nodes 210 via communication interface 214. Alternatively, the application server 140 may access the application data management network nodes 210 using open APIs provided by the core network 130. While FIG. 2 only shows a single application server, those having ordinary skill understand that in practical implementations, the core network 130 may supporting a plurality of service applications of different types.

In some particular situations, the application server 140 may be provided with a mechanism to proactively and dynamically influence data traffic routing in the core network 130 that would otherwise be exclusively controlled and provisioned by the network nodes within the confine of the core network 130 itself. As one of many examples, the application server 140 may desire to have data traffic associated with the application server offloaded to some local data network. To enable such a capability for the application server 140 to influence the data traffic, the application data management network nodes 210 may be configured to recognize and process a special request to influence data traffic routing from the application server 140. The request may be sent to one or more application data management network nodes 210 distributed in the core network 130. For example, the application server 140 may only send data traffic routing influencing requests to application data management network nodes 210 that are geographically close to the application server 140 (e.g., regional application data management network nodes). Alternatively, the application server 140 may send data traffic routing influencing requests to application data management network nodes 210 that have wider geographical distribution. The data traffic routing influence request, for example, may specify one or more UEs whose data traffic that the application server 140 would like to influence (e.g., offload) and what type of data traffic routing influence that the application server 140 would like to effectuate.

In some implementations, one or more policy control network nodes 220 may choose to subscribe to data updates in one or more application data management network nodes, as shown by 212 in FIG. 2. As such, update of application data in an application data management network node 210 (such as a new data traffic routing influence request from the application server 140) may be automatically disseminated to one or more policy control network nodes 220 having subscription to the application data management network nodes 210. Such application data update may further be disseminated from the policy control management network nodes 220 to the access management network nodes 230 and/or the session management network nodes 240 respectively via the interface 224 and 222 to control a creation of a future communication session and data traffic pipeline or reconfigure an existing active communications session and data traffic pipeline involving a UE implicated by the data traffic routing influence request to accommodate the data traffic routing modification as requested by the application server.

The implementations described above in FIGS. 1 and 2 apply to both wireless and wireline communication systems. For a wireless communication system, the access networks 120 would be implemented, for example, as radio access networks (RANs) distributed throughout the service areas of the carrier network 102. The RANs, for example, may include a plurality of radio base stations such as those implemented in various generations of cellular wireless networks. The communication between the UE 110 and the core network 130 would be carried in over-the-air (OTA) radio channels. An example wireless communication network is illustrated in FIG. 3.

Figure 3:
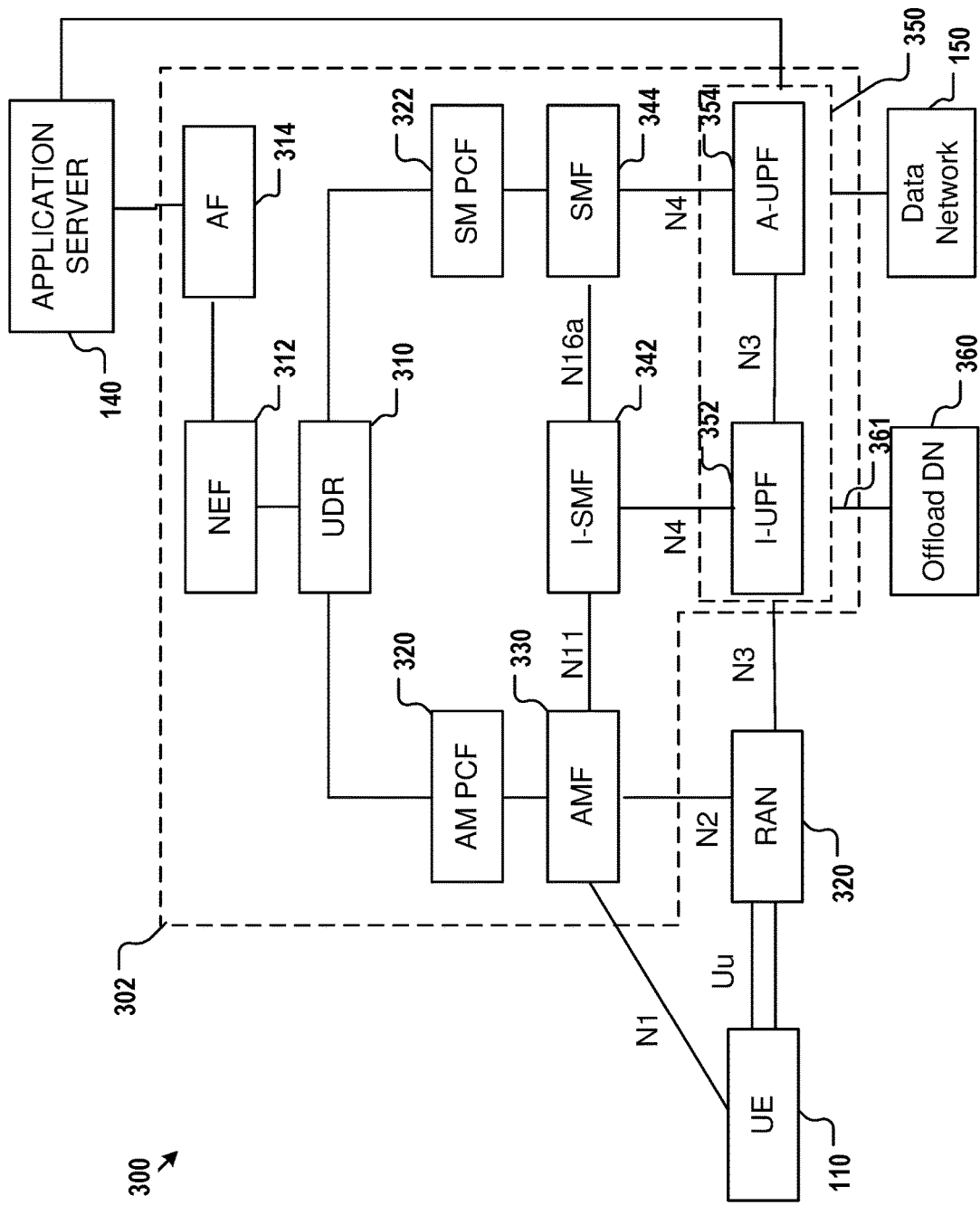
FIG. 3 shows an example wireless core network that supports data traffic routing influence by service applications.

FIG. 3 shows that the wireless communication network 300 may include UE 110, application server 140, data network 150, and a carrier network including RAN 320 and core network 302. The UE 110 may be implemented as various types of mobile devices that are configured to communicate with the RAN 320 via the OTA communication channels. The UE 110 may include but is not limited to mobile phones, laptop computers, tablets, Internet-Of-Things (IoT) devices, distributed sensor network nodes, wearable devices, and the like. While only single instances of network nodes for some functions of the wireless network 300 and the core network 302 in particular are illustrated in FIG. 3, those of ordinary skill in the art understand that each of these network nodes may have multiple instances that are distributed throughout the wireless communication network 300. The network "nodes" in the core network 302 are alternatively referred to herein as network "functions".

As shown in FIG. 3, the core network 302 may include application functions (AF) 314, network exposure functions (NEF) 312, and unified data repository (UDR) functions 310. These three types of network nodes may serve together as the application data management network nodes 210 of FIG. 2. The core network 302 may further include access and mobility management functions (AMF) 330, and session management functions (SMF or I-SMF, denoting intermediate SMF) 344 and 342. The AMF and the SMF serve as the access management network nodes (AMNNs) 230 and the session management network nodes (SMNNs) 240 of FIG. 2, respectively. The AMF 330 and SMFs 344 and 342 may obtain communication policy information from separate access/mobility management policy control functions (AM PCF) 320 and session management policy control function (SM PCF) 322, respectively. The AM PCF 320 and SM PCF 322 serve as the policy control network nodes (PCNNs) 220 of FIG. 2.

As further shown in FIG. 3, each of the SMFs and I-SMFs 322 and 344 controls one or more user plane functions (UPF) 352 and 354. The RAN 320 and one or more UPFs may be allocated by the core network and form a carrier network portion of a data traffic pipeline (or alternatively, a data traffic path) for a particular communication session. The UPFs 352 and 354 serve as the data routing network nodes (DRNNs) 250 of FIG. 2. The user plan functions may include one or more anchor UPFs (A-UPFs) 354 controlled by the SMFs 344 and one or more intermediate UPFs (I-UPFs) 352 controlled by the I-SMFs 342, as will be described in more detail below.

The various network nodes or network functions in FIG. 3 communicate signaling information and data through various communication interfaces as indicated by the various connection lines in FIG. 3 using signaling or data messages following predetermined types of format or protocols. Some example communication interfaces as defined, for example, in the 5$^{th}$ generation new radio wireless communication specifications, may be used in the communication network 300 between the various network nodes as indicated by the labels along the connection lines in FIG. 3, including the N1 interface between the UE 110 and the AMF 330 via the RAN 320, the N2 interface between RAN 320 and the AMF 330, the N3 interface between the RAN 320 and the UPFs 350, the N4 interface between the SMFs 342/344 and the UPFs 350, the N11 interface between the AMF 330 and the I-SMFs 342, and the N16a interface between the I-SMFs 342 and the SMFs 344.

Examples of the functionality of the various network nodes and network functions in the wireless communication network 300 of FIG. 3 are described in more detail below:

1) AMF (Access and Mobility Management function) 330. These network nodes perform the functionalities including but not limited to registration management, connection management of, reachability management and mobility management of UE 110. These network nodes also perform access authentication and access authorization. The AMF 330 may function as non-access stratum (NAS) security termination and relay the session management NAS messages between the UE 110 and SMFs 342 and 344. The AMF 330 also performs SMF selection function during communication session establishment procedure and UE mobility procedure.

2) SMF (Session Management Function) 344. These network nodes perform the functionalities including but not limited to establishment, modification, and release of communication sessions, UE IP address allocation and management (including optional authorization functions), selection and control of UPFs 350, and downlink data notification. Each SMF 344 can control one or more UPFs 354 and is associated with a service area being a collection of UPF service areas of all UPFs under its control.

3) I-SMF (Intermediate SMF) 342. An I-SMF that is inserted, changed or removed to a communication session as needed to control I-UPFs 352 which cannot be controlled by the original SMF 344 selected for the communication session because the they belong to a different SMF service area.

4) UPF (User plane function) 350. These network nodes perform the functionalities including but not limited to serving as an anchor point for intra-/inter-radio access technology (RAT) mobility, packet routing and forwarding, traffic usage reporting, quality of service (QoS) handling for the user plane, downlink packet buffering and downlink data notification triggering. A UPF service area includes an area consisting of one or more tracking areas within which a communication session associated with the UPF can be served by RAN nodes via a direct interface (e.g., N3 interface as shown in FIG. 3) between the RAN and the UPF without need to add a new UPF in between or to remove/re-allocate the UPF. An A-UPF (354 of FIG. 3) is an anchor UPF which is keep unchanged during the UE mobility. The intermediate UPF (I-UPF) may be inserted/relocated when the UE moves outside of the A-UPF service area. An I-UPF may use, e.g., N3 tunnel as indicated in FIG. 3, to connect with RAN 320 and may use, e.g., N9 tunnel as indicated in FIG. 3, to connect with A-UPF 354. An I-UPF may also provide traffic offloading function to route uplink data traffic to local data network 360, as will be described in more detail below.

5) PCF (Policy Control Function) 320 and 322. These network nodes perform the functionalities including but not limited providing policy rules and controlling other network nodes to enforce the policy rules. Specifically the PCF provides access and mobility related policies to the AMF 330 so that the AMF 330 enforces them during mobility procedure. These PCFs are referred to as AM PCF (320 of FIG. 3). The AM PCF 320 further provides UE access selection and communication session selection related policies (UE policy) to AMF 330 for the AMF forward to UE 110. The PCFs may further provide session management related policies to the SMFs 344 for the SMFs to enforce. These PCFs may be referred to as SM PCFs (322 of FIG. 3). The AM PCFs 320 and the SM PCFs 322 may be deployed in a distributed manner and each PCF may support different AM or SM policy functions.

6) UDR (Unified Data Repository) 310. These network nodes may support the storage/retrieval of structured data for network exposure, application data (e.g., packet flow descriptions (PFDs) for application detection, application request information for multiple UEs, and application request for data traffic routing influence, as described above and in more detail below), and storage/retrieval of network group ID corresponding to subscriber identifier (e.g., External Group ID or Internal Group ID). A UDR 310 may be located in the same public land mobile network (PLMN) as network application service to which it provides application data storage.

7) NEF (Network Exposure Function) 312. These network nodes may store/retrieve information as structured data using a standardized interface (e.g., Nudr interface) to UDRs 310. The NEF 312 may provide a means for the Application Functions (AF, see below) to securely provide various information to the core network, including but not limited to information with respect to application influence on data traffic routing. The NEF 312 may authenticate, authorize and assist in throttling requests from the AFs. Access to NEF 312 may be through open APIs provided by the core network 302. A specific NEF instance may support one or more of these functionalities and consequently an individual NEF 312 may support a subset of the APIs specified for NEFs. An NEF 312 may be configured to access UDRs 310 located in the same PLMN as the NEF 312.

8) AF (Application Function) 314. These network nodes may interact with the core network 302 in order to provide services to applications, for example, to support application influence on data traffic routing. An AF 314 may interact with the application on one end and the network functions in the core network via NEF 312 on the other end. In some implementations, an AF 314 considered as trusted by the core network 302 may bypass the NEF 312 and interact directly with other relevant network functions in the core network 302.

9) NRF (Network Repository Function, not shown in FIG. 3). These network nodes may store profiles of all available network function instances in the core network 302 and their supported services. NRFs may support service discovery function. When an NRF receives a network function discovery request, it provides the information of discovered network function instances to the requesting entity. Upon instantiation, a new network function instance in the core network registers its network function profiles with the NRF so that it can be discovered by other network function instances by querying the NRF.

The various network nodes or functions described above and depicted in FIG. 3 may be configured to achieve, in a collaborative manner, adaptive and dynamic data traffic routing influence initiated by service applications in the core network 302. In some implementations, the application server 140 may initiate a data traffic routing influence by sending a request to the AF 314. The request may target influencing routing of data traffic directed to the application and associated with a particular UE, a group of UEs, or all UEs. In particular, the application server 140 may desire to influence the data traffic routing, e.g., routing path or routing timing, of one or more UEs in various manners. For example, the request may specify one or more UEs whose data traffic directed towards the application that the application server 140 would like to offload to some local data network. The request may then be processed, formatted and recorded in a UDR 310 via the NEF 312. The PCFs (including AM PCF 320 and SM PCF 322) may then be automatically notified of the application data updates in the UDR 310 with respect to the requested data traffic routing influence via a data subscription service provided by the UDR 310 to other network nodes of the core network 302. The AM PCF 320 and SM PCF 322 may then use the information for the data traffic routing influence to (1) control the AMF 330 to select, replace, or add SMFs for future communication sessions or existing active communication sessions involving the UEs targeted in the data traffic routing influence request, and/or (2) control the SMFs to directly or via the AMF 330 to select, replace, insert, configure, and modify the UPFs 350 in data traffic pipelines for future communication sessions or existing active communication sessions involving the UEs targeted in the data traffic routing influence request. As a result, a newly created communication session with its new data traffic pipeline or a modified/reconfigured existing active communication session with its modified data traffic pipeline may be configured to implement the data traffic routing influence as requested by the application server 140. For example, data traffic from a targeted UE may be offloaded to local data network specified in the request from the user plane 350 of the data routing pipeline, as shown by 360 and 361 of FIG. 3.

For example, when creating a new communication session between the UE 110 and the application server 140, the AMF 330 may first determine whether the application server 140 has requested data traffic routing influence and whether the UE 110 was targeted. Upon determining that the application did request data traffic routing influence and that the UE 110 was targeted, the AMF 330 selects a combination of SMFs that supports the requested data traffic routing influence (such as data offloading) as session-control network nodes for the new communication session. The selected SMFs then further select and configure a set of UPFs 350 that are under their control and support the requested data traffic routing influence to form a data routing pipeline for the new communication session.

For another example, the application server 140 may request a data traffic routing influence involving a particular UE 110, and a communication session between the UE 110 and the application may have already been previously established and is currently active. The data traffic routing influence may still be effectuated in the currently active communication session with a collaborative interworking between the AMF 330 and the SMFs 344 that are in control of the currently active communication session. Specifically, the AMF 330 may have application data subscription to the UDR 310 through the AM PCF 320 where application data associated with the application server 140 is being updated and deposited, and the AMF 330 thus may be automatically notified of information related to the data traffic routing influence request by the UDR 310 through the Am PCF 320. The AMF 330 may then reconfigure the SMFs already involved in controlling the active communication session to support the requested data traffic routing influence if one or more of these SMFs are already capable of supporting the requested data traffic routing influence. Otherwise, the AMF 330 may replace one or more of the SMFs in the group of SMFs controlling the current communication session with new SMFs that support the requested data traffic routing influence, or, in the alternative, insert new SMFs that support the requested data traffic routing influence into the previously allocated group of SMFs for controlling the currently active communication session. Likewise, if there is at least one UPF 350 within the existing data traffic routing pipeline for the currently active communication session supports the requested data traffic routing influence, the at least one UPF may then be reconfigured by a corresponding SMF to support the requested data traffic routing influence. Otherwise, the SMFs may replace one or more of the UPFs in the group of UPFs 350 involved in the current communication session with one or more new UPFs that support the requested data traffic routing influence, or, in the alternative, insert new UPFs that support the requested data traffic routing influence into the previously allocated group of UPFs 350 for the currently active communication session.

In the implementations above, the UDRs 310 in the core network 302 may be distributed geographically. The application server 140 may choose to record application data updates (including application data updates involving data traffic routing influence requests) in one or more UDRs. For example, the application server 140 may record its application data updates only in UDRs that are local to the application server 140. Likewise, the PCFs 320 and 322 may also be deployed in a distributed manner. The PCFs may choose to subscribe to one or more UDRs for obtaining application data updates. For example, a PCF may choose not to subscribe to every UDR and may choose only to subscribe to UDRs that are local to the particular PCF. As such, an AMF 330 and/or SMF 342/344 may be associated with PCFs (320 or 322) that are not subscribed to a UDR containing relevant application data updates for a particular future or existing communication session of interest. In some implementations, as described in more detail below with respect to the flow charts in FIGS. 4-6, the AMF 330 may be configured to implicitly subscribe to all AM PCFs 320, Because at least one of the AM PCFs 320 distributed in the core network 302 receive application data updates from an application server (even if the application data updates may be only recorded in some local UDRs of the application server), the AMF 330 would always obtain relevant application data updates for a particular communication session. During the process of establishing a new communication session or reconfiguring an existing communication session, the AMF 330 may inform selected or existing SMFs about the identity of the UDR containing the relevant application data updates and the SMFs may then inform its corresponding SM PCFs such that the corresponding SM PCFs may then selectively subscribe to the particular UDRs, which may be non-local to the SMFs and thus was not previously subscribed to by the corresponding SM PCFs.

Figure 4:
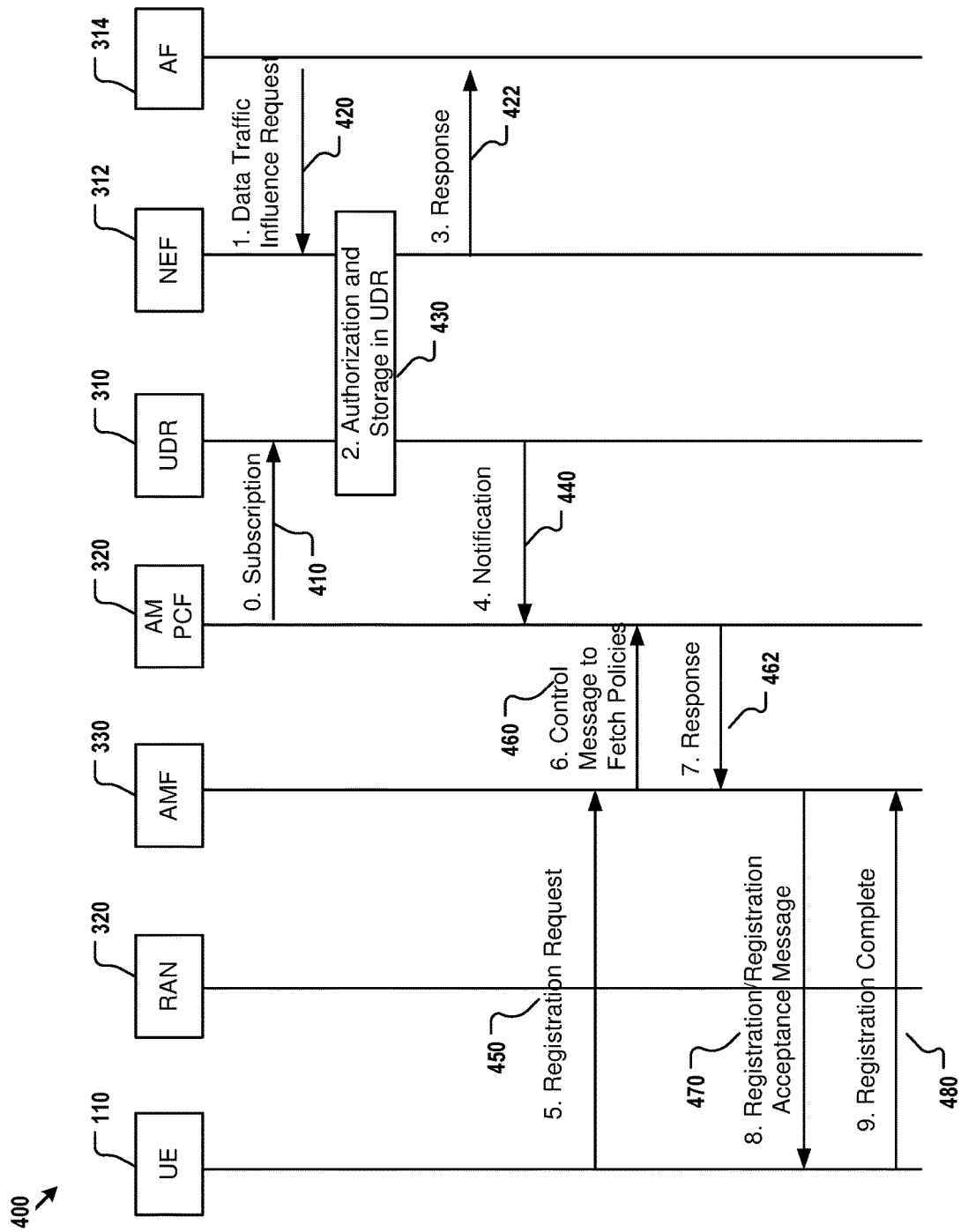
FIG. 4 illustrates an example data and logic flow for application data subscription service among core network nodes to enable data traffic routing influence by service applications.
Figure 5:
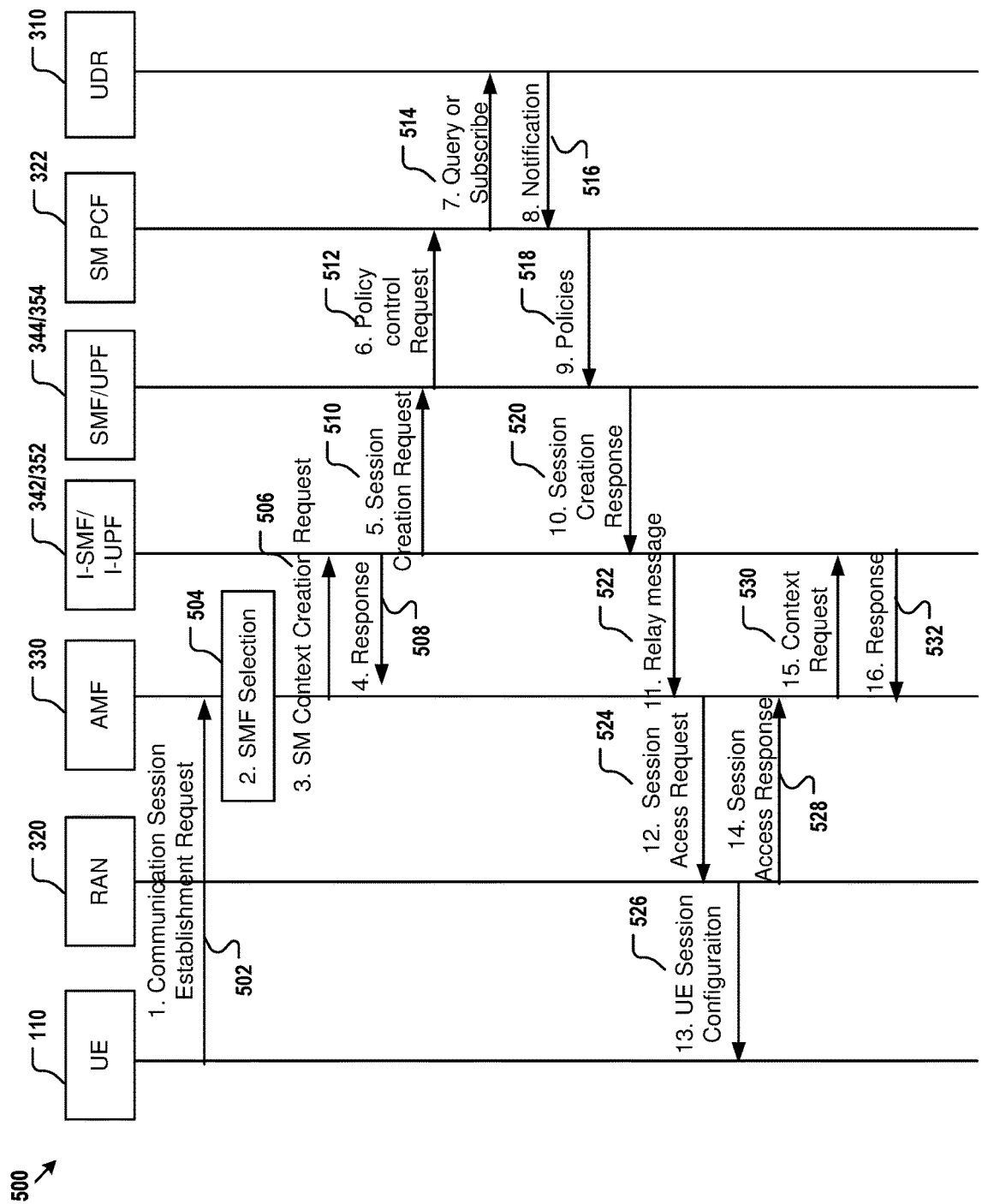
FIG. 5 illustrates an example data and logic flow for establishing and configuring network nodes for a communication session in a core network that supports data traffic routing influence requested by service applications.
Figure 6:
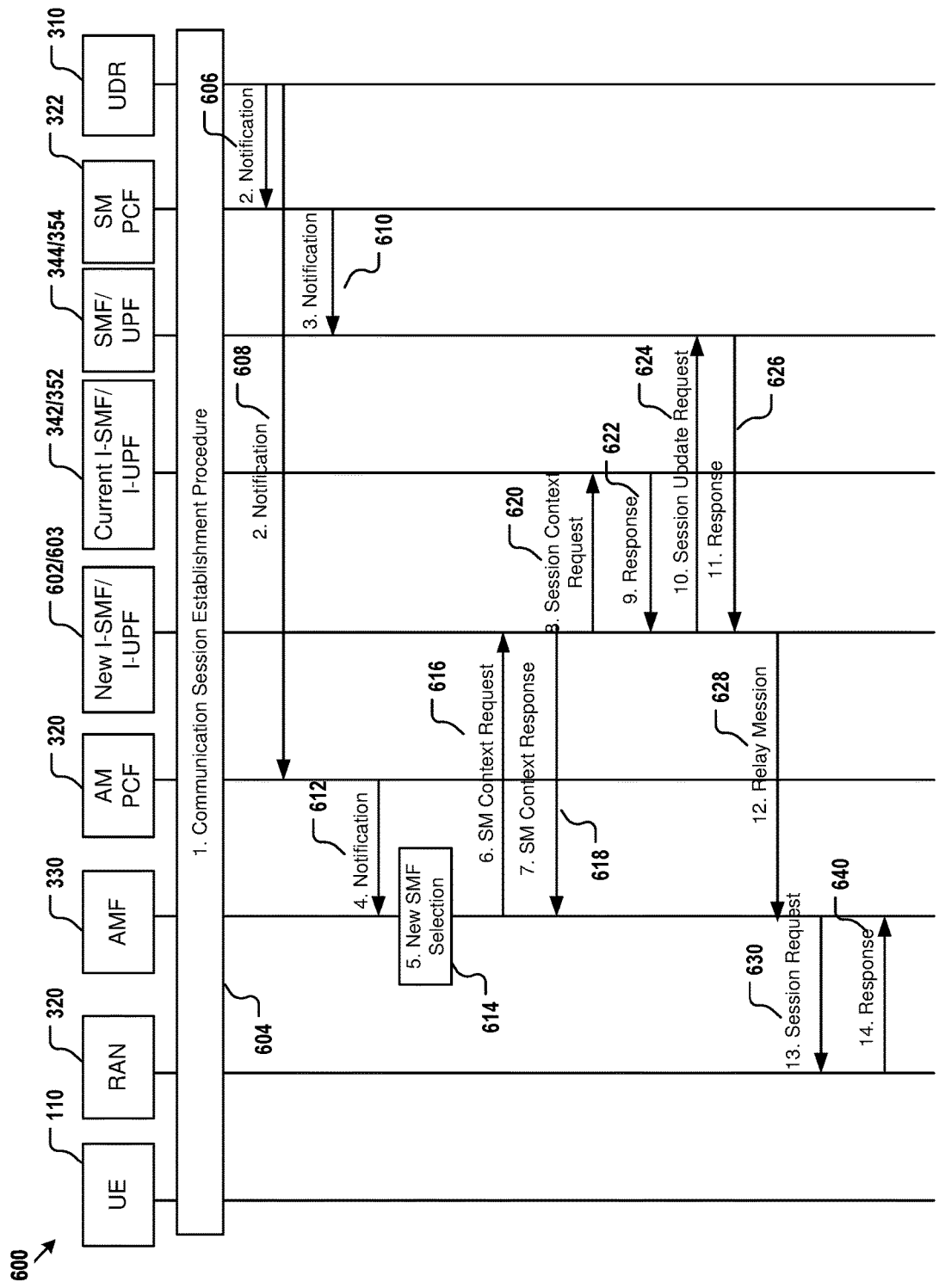
FIG. 6 illustrates an example data and logic flow for modifying and reconfiguring an existing communication session to support data traffic routing influence requested by service applications.

FIGS. 4-6 provides example data and logic flows for implementing data traffic routing influence initiated by the application server in the communication system 300 of FIG. 3. While these flow charts are discussed in the context of a particular example wireless communication network 300, the underlying principle applies to other wireless and non-wireless communication networks.

FIG. 4 illustrates an example data and logic flow 400 for subscription service among core network nodes or functions of FIG. 3 to enable influence of data traffic routing by service applications. The data and logic flow 400 include exemplary steps labeled from 0 to 9. Also in reference to the network functions or nodes in FIG. 3, the example data and logic flow 400 may include the following steps.

0. As shown by 410 of FIG. 4, the AM PCF 320 performs subscription in UDR to modification or update of a full set or a subset of application data. For example, the AM PCF 320 may subscribe to any modification and update of application data. For another example, the AM PCF 320 may choose to only subscribe to modification of application data related to data traffic routing influence requested from application servers via the AF. Information related to data traffic routing influence updates may include, for example, single network slice selection assistance information (S-NSSAI) for network slices targeted by the application server when network slicing is implemented in the core network, and data network name (DNN) and/or internal group identifier or subscription permanent Identifier (SUPI) for networks targeted by the application server. The UDR 310 that the AM PCF 320 is configured to subscribe may be deployed close to the AM PCF 320. For example, the AM-PCF 320 may only subscribe to UDR 310 in the same region (see the discussion above). Alternatively, the AM PCF 320 may be subscribed to a broader range of UDRs.

1. As shown in FIG. 4, the application server 140 may invoke a data traffic routing influence request 420 into the core network via the AF 314 and NEF 312. The data traffic routing influence request 420 may be one of a set of various types of service requests that the application server may invoke in the core network via, for example, open APIs provided by the core network. The information content of the data traffic routing influence request 420 may, for example, include:
   a. The network address (IP or Ethernet) of the UE (if the UE is specifically targeted by the request), target DNN, and target S-NSSAI. Such information may be used to identify the existing or future communication sessions in the core network which are subject to data traffic routing influence. Specifically, the data traffic routing influence request 420 may target a communication session already established in the core network, and in this case, the address of the UE 110 may be included in the request. The data traffic routing influence request 420 may also target future communication sessions, and correspondingly, only the DNN and S-NSSAI information may be included for specifying the constraint for future communication sessions where the requested data traffic routing influence should be effectuated.
   b. Generic public subscription identifier (GPSI) and external group identifier (EGI). Such information may be used to identify a particular UE, or a group of UE targeted by the data traffic routing influence request 420. The NEF 312 may further convert the EGI in to some internal group identifier of the UE tracked by the core network. If none of the GPSI and EGI is provided in the data traffic routing influence request 420, the request may be treated as targeting any UE that attempts to access the core network.
   c. Application identifier or traffic filtering information and AF-service-identifier. Such information may be used to identify the application initiating the request and the associated data traffic whose routing is to be influenced (e.g., to be offloaded)
   d. A list of data network access identifiers (DNAIs) and corresponding routing profile IDs (e.g., traffic routing information and other related parameters in N6 interface in a 5G core network). Such information is used to identify the user plane access to one or more data networks where the data traffic is to be offloaded (when the data traffic routing influence request 420 is intended for data traffic offload). The SMF may use the DNAI to select or reconfigure one or more UPFs for offloading data traffic to data networks as specified by the DNAI. The request 420 may also contain an AF Transaction ID.

2. A shown by 430 of FIG. 4, the NEF 312 ensures the necessary authorization control, performs throttling of requests from the AF 314, and maps from the request information provided by the AF into information recognized by the core network (for example, mapping from the AF-service-identifier to the DNN and S-NSSAI, or from EGI to internal group identifier, as described above). The NEF 312 stores the request information in the UDR 310.

3. As shown by 422 of FIG. 4, the NEF 312 responds to the AF 314 to acknowledge the receipt of the data traffic routing influence request 420.

4. As shown by 440 of FIG. 4, the AM-PCF 320 subscribed to notification from UDR 310 in step 0 receives a notification of application data change from the UDR 310 and may store the notification data locally.

5. As shown by 450 of FIG. 4, UE 110 may initiate a registration procedure towards the AMF 330 via RAN 320 later on.

6. As shown in FIG. 4, the AMF 330, upon receiving the registration request from UE 110, may send a control message 460 to the AM PCF 320 to establish an AM policy control association with the AM PCF 320. The control message may include SUPI, internal group ID of the UE, subscription notification indication and, if available, service area restrictions, RAT (radio access technology) frequency selection priority (RFSP) index, subscribed UE aggregated maximum bit rate (AMBR), allowed NSSAI, and GPSI which are retrieved from the user data management during location-update procedure. The control message 460 may further include access type and RAT, permanent equipment identifier (PEI) of the UE, user location information (ULI) of the UE, UE time zone, and serving network information.

7. As shown by 462 of FIG. 4, The AM-PCF 320 responds to the control message 460. For example, the AM PCF 320 may provide access and mobility related policy information and policy control request trigger of AM policy association to AMF 330. In addition, the AM PCF 320 may provide the data traffic routing influence request information to the AMF 330 if the AM PCF 320 determines that this UE 110 are targeted by some application for data traffic routing influence, for example when a data traffic routing influence request information targets any UE, or a group of UE that includes the UE requesting registration according to the internal group ID, or this particular UE. The AMF 330 may further stores the data traffic routing influence request information in the UE context. The AMF 330 may be implicitly subscribed in the AM PCF to be notified of changes and updates in the policies.

8. As shown by 470 of FIG. 4, the AMF 330 further deploys the access and mobility related policy information, stores service area restrictions and policy control request trigger of AM policy association, provisions service area restrictions to the UE 110, and provisions the RFSP index, the UE-AMBR and service area restrictions to the RAN 320. The AMF 330 further allocates an a globally unique temporary identifier, an available NSSAI and registration area to the UE 110, and delivers these parameters to the UE 110 in a registration acceptance message as indicated in 470.

9. As shown by 480 of FIG. 4, after receiving the registration accept message 470, the UE 110 may send registration complete message to the AMF 330 to confirm the reception of message 470.

The steps labeled as 5-9 above are part of a full registration procedure and are indicated in FIG. 4 to focus on the interaction of the AMF 330 with AM PCF 320. Other processes involved in the full registration procedure, e.g., the authentication process and other processes, are not shown in FIG. 5 but may be included in the implementation described above.

FIG. 5 illustrates an example data and logic flow 500 in establishing and configuring network nodes for a new communication session in a core network that support data traffic routing influence requested by a service application according to the underlying principles described above with respect to FIG. 3. The example data and logic follow 500 may include the following steps.

1. The UE 110 may send a communication session establishment request 502 to the AMF 320 via the RAN 320. For example, this request may be carried by a non-access-stratum (NAS) message between the core network and the UE 110. The message may include information such as an S-NSSAI/DNN (or S-NSSAIs/DNNs), communication session ID, and request type (such as session establishment type).

2. The AMF 330 may select an SMF (344) and/or additional I-SMF (342 for controlling the communication session via the NRF or local configuration, as indicated by 504 of FIG. 5. When the SMF 344 is selected via the NRF, the AMF 330 may provide the DNN and S-NSSAI to the NRF as a basis for the NRF to select the SMF 344 together with the service area of the selected SMF 344. If it is determined by the AMF 330 that no data traffic routing influence request is applicable to this communication session and if the UE's current location is within the service area of the selected SMF, the AMF 330 may determine that there is no need to select any I-SMF besides the selected SMF. If it is determined by the AMF 330 that no data traffic routing influence request is applicable to this communication session but if the UE's current location is not within the service area of the SMF, the AMF 330 may send the current location of the UE to the NRF so that the NRF can select an I-SMF which can serve the current UE location. When the AMF 330 determines that a data traffic routing influence request is applicable to (or implicate) this communication session, the AMF 330 may send the DNAI in addition to the UE location to NRF, so that the NRF can select an SMF or I-SMF that is capable of supporting the DNAI. For example, the NRF may evaluate supporting DNAI lists of SMFs and select an SMF or I-SMF having a DNAI list that include the DNAI sent from the AMF 330. In the case that the AMF 330 determines that a data traffic routing influence request is applicable to this communication session and the UE's current location is within the service area of the SMF, but the SMF serving the current location does not support any DNAI specified in the data traffic routing influence request information, the AMF 330 may send the DNAI and UE location to the NRF to select an I-SMF that supports the DNAI for the new communication session.

3. If the AMF 330 has selected a new I-SMF 342 as described above, it may send a SM context creation request message 506 to the newly selected I-SMF 342 for requesting creation of a SM context for the new communication session. The SM context creation message 506, for example, may include information such as communication session ID, SM context ID, UE location info, access type, RAT type, operation type, and ID of the controlling SMF.
4. Upon receiving the SM context creation request message 506 from the AMF 330, the I-SMF 342 send a response message 508 to the AMF 330 as an acknowledgement.
5. With the controlling SMF information, the I-SMF 342 further proceeds to send a SM session creation request 510 to the controlling SMF 344. The SM session creation request 510 may, for example, include information such as SUPI, communication session ID, downlink (DL) tunnel information needed for an I-UPF controlled by the I-SMF, SM context ID at the I-SMF, access type, RAT type, and the DNAI list supported by the I-SMF 342.
6. The SMF may determine that the policy control and charge (PCC) authorization is required and may request to establish an SM policy association with the SM PCF 322 by sending a policy control request message 512 to the SM PCF 322. The policy control request message 512 may, for example, include information such as SUPI, communication session ID, communication session type, S-NSSAI, DNN, GPSI (if available), access type, IPv4 address and/or IPv6 network prefix, user location information, serving network, RAT type, charging characteristics, communication session AMBR, and UE internal group identifier.
7. If the SM PCF 322 does not have the subscription related information, it may send a query to the UDR 310 to obtain information pertinent to policy determination for the communication session, as indicated in 514 of FIG. 5. The query may, for example, include information such as SUPI, DNN, S-NSSAI, policy data, and communication session policy control data. The SM PCF 322 may request notifications from the UDR on changes in the subscription information. In addition the SM PCF 322 may subscribe in the same or different UDR to any modification of application data by sending a subscription request to the UDR 310, as indicated in 514 of FIG. 5. The subscription request, for example, may include information such as types of application data to subscribe to, subset of application data (such as data traffic routing request information) to subscribe to, S-NSSAI and DNN and/or internal group identifier or SUPI. The SM PCF 322 may determine which UDR to subscribe to based on the current user location information of the UE.
8. If the UDR 310 has the data traffic routing influence request information applicable to the new communication session, the UDR 310 may then send a notification with the traffic routing influence information to the SM PDF 322, as indicate by 516 of FIG. 5.
9. As indicated in 518 of FIG. 5, the SM PCF 322 then makes authorization and the policy decision and answers the policy control request 512 from the SMF 344 by sending a policy control response to the SMF 344, as indicated by 518 in FIG. 5. In its response, the SM PCF 322 may provide policy PCC rules to the SMF 344. The PCC rules may include, for example, the traffic steering enforcement control associated with the application data traffic routing influence request. The SMF 344 may implicitly subscribe to corresponding SM PCF 322 for changes in the policy decisions and is responsible for enforcing the PCC rules.
10. SMF 344 then sends to the I-SMF 342 a session creation response 520 to the session creation request 510 above in step 5. The session creation response 520 may, for example, include information such as quality-of-service (QoS) rules, QoS profiles (for all QoS pipes in the communication session), DNAIs of interest, and information for communication interface between the I-SMF and I-UPF (e.g., the N4 interface shown in FIG. 3)). The SMF 344 determines the DNAIs of interest for the communication session based on the DNAI list supported by the I-SMF 342 and determines the application data traffic steering enforcement control information in the PCC rules. For example, the SMF 344 may provide to the I-SMF with DNAIs of interest for this new communication session for local traffic steering (e.g., offloading). The SMF 344 may generate the information for local traffic offload based on the available DNAIs indicated by the I-SMF, PCC rules associated with these DNAIs, and charging requirement. The SMF 344 may provide information for communication interface between the I-SMF and I-UPF (e.g., N4 information of FIG. 3) to the I-SMF 342 to indicate how the data traffic shall be detected, enforced, monitored in I-UPFs controlled by the I-SMF 342. The I-SMF 342 may derive rules installed in the I-UPFs controlled by the I-SMF via, e.g., the N4 interface of FIG. 3. In some implementations, based on the DNAIs of interest, the I-SMF 342 may select a new I-UPF which supports the received DNAIs of interest for the new communication session sent from the SMF 344, and insert the new I-UPF into the user plane data pipeline for the communication session.
11. The I-SMF 342 may then send to the AMF 330 a relay message 522. The relay message 522 may, for example, include information parameters such as communication session ID, information with respect the communication interface between the AMF 330 and the RAN 320 (e.g., the N2 interface in FIG. 3), information with respect the communication interface between the RAN 320 and the UPFs (354 and 352) (e.g., the N3 interface of FIG. 3), and information with respect to the communication interface between the UE 110 and the AMF 330 (e.g., the N1 interface through RAN 320 indicated in FIG. 3). For example, the N2 information may include communication session ID, QoS flow identities, and QoS profiles.
12. AMF 330 may then send to the RAN 320 a session access request 524 for the communication session via, e.g., the N2 interface shown in FIG. 3. The session access request 524 may, for example, include information such as N2 SM information and NAS message including information such as the communication session ID and N1 session management container (FIG. 3).
13. The RAN 320 may then issue access network specific signaling exchange for UE session configuration with the UE 110 that is related to the information received from SMF 344 (through the flow path of 520 and 522), as indicated in 526 of FIG. 5. For example, in case of a new radio RAN, a radio resource control (RRC) connection reconfiguration may take place with the UE for establishing the necessary new radio RAN resources related to the QoS rules for the session access request 524 received in step 12 above. The RAN 320 may also allocates RAN tunnel information for the communication session. RAN 320 may further forward the NAS message provided in step 12 above to the UE 110.

14. The RAN 320 may then send a session access response message 528 to the AMF 330 in response to the session access request 524 above in step 12.
15. The AMF 330 may then sent a context request message 530 to the I-SMF 342. The context request message 530 may, for example, include information such as SM context ID, N2 SM information, and request type. For example, the AMF 330 may forward the N2 SM information received from RAN 320 to the I-SMF 342.
16. The I-SMF 342 may then send a response 532 to the context request 530 to the AMF 330, as indicated in 532 of FIG. 5.

In the example data and logic flow 500 of FIG. 5, the session creation flow may include other process and information exchange between the UPFs and the SMFs and other procedures, which are omitted in FIG. 5 and the description above for simplicity.

FIG. 6 illustrates an example data and logic flow 600 for modifying and reconfiguring an existing communication session to support data traffic routing influence requested by a service application according to the underlying principles described above with respect to FIG. 3. The example data and logic follow 600 may include the following steps.

1. The AMF 330 establishes an existing communication session in the core network, as shown in 604 of FIG. 6. During the establishment of the existing communication session, even if the communication session may not have been implicated by any data traffic routing influence request from any service application at the time of the establishment, one or more I-SMFs 602 may have been inserted into the session control plane of the communication session in some situations (for example, where the I-SMFs with corresponding UPFs may need to be included in the control plane due to mobility of the UE). These I-SMFs are indicated in FIG. 6 as current I-SMFs 342. These current I-SMFs 602 and the corresponding current I-UPFs 603 already allocated to the existing communication session may or may not be capable of supporting later data traffic routing influence that are requested by a service application via the AF and that may implicate the existing communication session. In the case that these current I-SMFs 342 in the existing communication session do support traffic data routing influence, the SMF 344 allocated to the existing communication session should already be aware of the DNAI lists supported by the current I-SMFs 342. In the implementations below, both the AM PCF 320 and SM PCF 322 are assumed to have subscribed to modification or updates of application data in the UDR 310, including application data updates related to traffic data routing influence requests.
2. While the existing communication session from step 1 is active, the application data may be updated by AF. As a result of application data update subscription, the UDR sends a data update notification 606 to the SMF PCF 322 and data update notification 608 to the AM PCF 320. The application data update may be related to a new data traffic routing influence request.
3. Once the SM PCF 322 is notified of the new data traffic routing influence request, it determines if the existing communication session established from step 1 is potentially impacted or implicated by the new request. In particular, the SM PCF 322 updates the SMF 344 associated with the existing communication session with corresponding new PCC rules including the updated influenced traffic steering enforcement control information, by sending a notification message 610. The SMF 344 may further determine, for example, that the current I-SMFs 342 do not support the requested DNAIs. There may be multiple current I-SMFs and each of such current I-SMFs may be similarly evaluated.
4. Likewise, the AM PCF 320 determines if the current UE in the existing communication session is potentially impacted or implicated by the data traffic routing influence request. The AM PCF 320 may update the AMF 330 with corresponding data traffic routing influence information by sending a notification 612.
5. The AMF 330 may determines that the current I-SMFs 342 do not support the requested DNAI in the new data traffic routing influence request. The AMF 330 may reselect a new I-SMF 602, as indicated in 614 of FIG. 5. In particular, the AMF 330 may send the UE location and requested DNAI to the NRF. In response, the NRF may return an I-SMF address which can support the requested DNAI and whose service area covers the current UE location. If the AMF 330 cannot find a proper I-SMF, the AMF 330 may keep the current I-SMFs 342 and the additional steps below may not need to be implemented. More than one new I-SMF may be selected in some implementations.
6. If the AMF 330 has found and selected a new I-SMF 602 that supports the requested DNAI, the AMF 330 may send session management context request 616 to the new I-SMF 602. The session management context request 616 may, for example, include information such as the current communication session ID, SM Context ID in the new I-SMF, the UE location information, access type, RAT type, operation type, and SMF ID. If more than one new I-SMF are found and selected, SM context request 616 would be send to each of the new I-SMFs.
7. Upon receiving the SM context request 616, the new I-SMF 602 may send a corresponding response 618 to the AMF 330.
8. The new I-SMF 602 may now interact with the current I-SMF 342 to retrieve the UE context from the current I-SMF 342 by sending a session context request message 620 to the current I-SMF 342. The session context request message 620 may include, for example, information such as SUPI, communication session ID, SM Context ID at the new I-SMF.
9. The current I-SMF 342 then returns a response 622 to the session context request 520 to the new I-SMF 602.
10. The new I-SMF 602 may further send a session update request 624 to the SMF 344. The session update request message 624 may include, for example, information such as SUPI, communication session ID, SM Context ID at new I-SMF, access type, RAT type, and DNAI list supported by new I-SMF.
11. The SMF 344 may then send a response 626 to the session update request 624 to the new I-SMF 602. The SMF 344 further determines the DNAIs of interest for the existing communication session based on the DNAI list supported by new I-SMF 602 and application traffic steering enforcement control in the new PCC rules received in step 3 above. For local traffic offloading, the SMF 344 may also provide to the new I-SMF 602 with DNAIs of interest for the existing communication session for local traffic steering. The SMF 344 may generate N4 interface information for local traffic off-load based on the available DNAIs indicated by the new I-SMF 602, PCC rules associated with these DNAIs and charging requirement. The SMF 344 may provide the generated N4 interface information to the new I-SMF 602 to indicate to the new I-SMF how the traffic shall be detected, enforced, monitored in corresponding I-UPFs controlled by the new I-SMF 602. The new I-SMF 602 uses this N4 interface information to derive rules installed in the I-UPFs controlled by the new I-SMF 602. In some implementations, based on the DNAIs of interest, the new I-SMF 602 may select a new I-UPF 603 that supports the received DNAIs of interest for the existing communication session from the SMF 344. Then the I-SMF 602 may then insert the new I-UPF 603 into the user plane data pipeline for the existing communication session.

12. The SMF 344 then send to the AMF 330 a relay message 628. The relay message 628 may, for example, contain information and parameters such as communication session ID, N2 interface SM information including communication session ID, QoS flow indexes, QoS profiles, new tunnel information of the new I-UPF 603.
13. The AMF 330 may send a session request 630 to the RAN.
14. The RAN 320 may finally send the AMF 330 a response 640 to the session request 630.

In the example data and logic flow above with respect to FIG. 6, the interactions between the UPFs and SMFs with respect to, for example, selection and control of the UPFs by the SMFs and their intercommunications are omitted for simplicity.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed in a mobile core network comprising an access and mobility control node, a policy control node associated with the access and mobility control node, an application data repository node, and a plurality of communication session control nodes, the method comprising:

receiving, by the access and mobility control node, a set of data traffic routing influence information associated with a service application from the policy control node, wherein the set of data traffic routing influence information is extracted by the policy control node from a notification message sent by the application data repository node to the policy control node as a result of a data subscription to the application data repository node by the policy control node for the policy control node to be informed of modification of application data;

receiving, by the access and mobility control node, a communication session establishment request from a requesting mobile user equipment;

determining, by the access and mobility control node, a location of the requesting mobile user equipment;

determining, by the access and mobility control node, whether the requesting mobile user equipment is implicated by the set of data traffic routing influence information; and when the requesting mobile user equipment is implicated by the set of data traffic routing influence information, selecting, by the access and mobility control node, a subset of communication session control nodes from the plurality of communication session control nodes based on the location of the requesting mobile user equipment and the set of data traffic routing influence information for establishing a new communication session in response to the communication session establishment request.

2. The method of claim 1, wherein the set of data traffic routing influence information comprises data traffic offload information.

3. The method of claim 2, wherein the data traffic offload information comprises a list of one or more network identifiers for one or more data networks outside of the mobile core network.

4. The method of claim 3, wherein the one or more data networks outside of the mobile core network are associated with the service application.

5. The method of claim 2, wherein determining whether the requesting mobile user equipment is implicated by the set of data traffic routing influence information comprises:
when the data traffic offload information does not include identity of any mobile user equipment, determining, by the access and mobility control node, that any mobile user equipment including the requesting mobile user equipment is implicated by the set of data traffic routing influence information.

6. The method of claim 2, wherein determining whether the requesting mobile user equipment is implicated by the set of data traffic routing influence information comprises:
when the data traffic offload information contains identities of one or more mobile user equipment derived from the notification message and when the requesting mobile user equipment is among the one or more mobile user equipment, determining, by the access and mobility control node, that the requesting mobile user equipment is implicated by the set of data traffic routing influence information.

7. The method of claim 2, wherein selecting the subset of communication session control nodes from the plurality of communication session control nodes based on the location of the requesting mobile user equipment and the set of data traffic routing influence information comprises selecting at least one session control node servicing a geographical area covering the location of the requesting mobile user equipment and supporting data traffic offload information.

8. A method performed in a mobile core network comprising an access and mobility control node, a policy control node associated with the access and mobility control node, an application data repository node, a plurality of communication session control nodes, and a plurality of data routing nodes, the method comprising:
receiving, by the access and mobility control node, a set of data traffic routing influence information associated with a service application from the policy control node, wherein the set of data traffic routing influence information is extracted by the policy control node from a notification message sent by the application data repository node to the policy control node as a result of a data subscription to the application data repository node by the policy control node for the policy control node to be informed of modification of application data;
determining, by the access and mobility control node, an identity of a mobile user equipment implicated by the set of data traffic routing influence information;
identifying, by the access and mobility control node, an active communication session associated with the identity of the mobile user equipment;
identifying, by the access and mobility control node, a subset of communication session control nodes among the plurality of communication session control nodes that are associated with and control a subset of data routing nodes among the plurality of data routing nodes; and
modifying, by the access and mobility control node, a composition or configuration of the subset of communication session control nodes according to the set of data traffic routing influence information.

9. The method of claim 8, wherein the set of data traffic routing influence information comprises data traffic offload information.

10. The method of claim 9, wherein the data traffic offload information comprises a list of one or more network identifiers for one or more data networks outside of the mobile core network.

11. The method of claim 10, wherein the one or more data networks outside of the mobile core network are associated with the service application.

12. The method of claim 9, wherein determining whether the mobile user equipment is implicated by the set of data traffic routing influence information comprises:
when the data traffic offload information does not include identity of any mobile user equipment, determining, by the access and mobility control node, that any mobile user equipment including is implicated by the set of data traffic routing influence information.

13. The method of claim 9, wherein determining whether the mobile user equipment is implicated by the set of data traffic routing influence information comprises:
when the data traffic offload information contains identities one or more mobile user equipment derived from the notification message and when the mobile user equipment is among the one or more mobile user equipment, determining, by the access and mobility control node, that the mobile user equipment is implicated by the set of data traffic routing influence information.

14. The method of claim 9, wherein modifying the composition of the subset of communication session control nodes according to the set of data traffic routing influence information comprises inserting an additional communication session control node that supports data traffic offload.

15. The method of claim 9, wherein modifying the composition of the subset of communication session control nodes according to the set of data traffic routing influence information comprises replacing by the access and mobility control node at least one of the subset of communication session control nodes with another communication session control node that supports data traffic offload information or causing the at least one of the subset of the communication session control nodes to replace at least one of the subset of data routing nodes with another data routing node that supports data traffic offload.

16. The method of claim 9, wherein modifying the configuration of the subset of communication session control nodes according to the set of data traffic routing influence information comprises reconfigure at least one of the subset of communication session control nodes to support data traffic offload.

17. A method performed in a mobile core network comprising an access and mobility control node, a policy control node associated with the access and mobility control node, an application data repository node, and a plurality of communication session control nodes, the method comprising:

registering, by the policy control node, a data subscription to the application data repository node for the policy control node to be notified of modification in application data;

receiving, by the policy control node, a notification message containing an modification of application data by a service application from the application data repository node as a result of the data subscription;

extracting, by the policy control node, a set of data traffic routing influence information associated with the service application from the notification message; and transmitting, by the policy control nod, the set of data traffic routing influence information to the access and mobility control node;

receiving, by the access and mobility control node, the set of data traffic routing influence information associated with a service application from the policy control node;

receiving, by the access and mobility control node, a communication session request from a mobile user equipment;

determining, by the access and mobility control node, a location of the mobile user equipment;

determining, by the access and mobility control node, whether the mobile user equipment is implicated by the set of data traffic routing influence information;

when the mobile user equipment is implicated by the set of data traffic routing influence information, selecting, by the access and mobility control node, a subset of communication session control nodes from the plurality of communication session control nodes based on the location of the mobile user equipment and the set of data traffic routing influence information.

18. A method performed in a mobile core network comprising an access and mobility control node, a policy control node associated with the access and mobility control node, an application data repository node, a plurality of communication session control nodes, and a plurality of data routing nodes, the method comprising:

registering, by the policy control node, a data subscription to the application data repository node for the policy control node to be notified of modification in application data;

receiving, by the policy control node, a notification message containing an modification of application data by a service application from the application data repository node as a result of the data subscription;

extracting, by the policy control node, a set of data traffic routing influence information associated with the service application from the notification message;

transmitting, by the policy control nod, the set of data traffic routing influence information to the access and mobility control node;

receiving, by the access and mobility control node, the set of data traffic routing influence information associated with a service application from the policy control node;

determining, by the access and mobility control node, an identity of a mobile user equipment implicated by the set of data traffic routing influence information;

identifying, by the access and mobility control node, an active communication session associated with the identity of the mobile user equipment;

identifying, by the access and mobility control node, a subset of communication session control nodes among the plurality of communication session control nodes that are associated with and control a subset of data routing nodes among the plurality of data routing nodes; and modifying, by the access and mobility control node, a composition or configuration of the subset of communication session control nodes according to the set of data traffic routing influence information.

19. One or more core network nodes comprising one or more processors and one or more memories, wherein the one or more processors are configured to read computer code from the one or more memories to implement a method in claim 1.

20. One or more core network nodes comprising one or more processors and one or more memories, wherein the one or more processors are configured to read computer code from the one or more memories to implement a method in claim 8.

* * * * *